United States Patent
Zidan et al.

(10) Patent No.: US 9,959,949 B2
(45) Date of Patent: May 1, 2018

(54) SOLID STATE ELECTROLYTE COMPOSITES BASED ON COMPLEX HYDRIDES AND METAL DOPED FULLERENES/FULLERANES FOR BATTERIES AND ELECTROCHEMICAL APPLICATIONS

(71) Applicant: SAVANNAH RIVER NUCLEAR SOLUTIONS, LLC, Aiken, SC (US)

(72) Inventors: Ragaiy Zidan, Aiken, SC (US); Joseph A Teprovich, Jr., Aiken, SC (US); Hector R. Colon-Mercado, Chicago, IL (US); Scott D Greenway, Aiken, SC (US)

(73) Assignee: SAVANNAH RIVER NUCLEAR SOLUTIONS, LLC, Aiken, SC (US)

( * ) Notice: Subject to any disclaimer, the term of this patent is extended or adjusted under 35 U.S.C. 154(b) by 540 days.

(21) Appl. No.: 14/295,987

(22) Filed: Jun. 4, 2014

(65) Prior Publication Data

US 2014/0356732 A1 Dec. 4, 2014

Related U.S. Application Data

(60) Provisional application No. 61/830,770, filed on Jun. 4, 2013.

(51) Int. Cl.
*H01B 1/06* (2006.01)
*C01B 32/156* (2017.01)
(Continued)

(52) U.S. Cl.
CPC ............. *H01B 1/06* (2013.01); *C01B 32/152* (2017.08); *C01B 32/156* (2017.08);
(Continued)

(58) Field of Classification Search
CPC ... H01B 1/00; H01B 1/02; H01B 1/04; H01B 1/20; H01B 1/22; H01B 1/24;
(Continued)

(56) References Cited

U.S. PATENT DOCUMENTS 5,470,680 A * 11/1995 Loutfy ................... B82Y 30/00
204/280
6,146,791 A 11/2000 Loutfy et al.
(Continued)

FOREIGN PATENT DOCUMENTS

JP 09295803 A * 11/1997
JP 2008013375 A * 1/2008
WO WO 2005/022666 A2 3/2005

OTHER PUBLICATIONS

Wellons et al., "Novel catalytic effects of fullerene for LiBH4, hydrogen uptake and release", Nanotechnology, Retrieved from http://www.osti.gov/scitech/servlets/purl/941111 (2008).*
(Continued)

*Primary Examiner* — Mark Kopec
*Assistant Examiner* — Matthew R Diaz
(74) *Attorney, Agent, or Firm* — J. Bennett Mullinax, LLC

(57) ABSTRACT

A $LiBH_4$—$C_{60}$ nanocomposite that displays fast lithium ionic conduction in the solid state is provided. The material is a homogenous nanocomposite that contains both $LiBH_4$ and a hydrogenated fullerene species. In the presence of $C_{60}$, the lithium ion mobility of $LiBH_4$ is significantly enhanced in the as prepared state when compared to pure $LiBH_4$. After the material is annealed the lithium ion mobility is further enhanced. Constant current cycling demonstrated that the material is stable in the presence of metallic lithium electrodes. The material can serve as a solid state electrolyte in a solid-state lithium ion battery.

5 Claims, 5 Drawing Sheets

(51) Int. Cl.
*C01B 32/152* (2017.01)
*H01M 10/0562* (2010.01)
*H01M 6/18* (2006.01)
*H01M 10/052* (2010.01)
*H01M 10/054* (2010.01)

(52) U.S. Cl.
CPC ....... *H01M 6/188* (2013.01); *H01M 10/0562* (2013.01); *H01M 10/052* (2013.01); *H01M 10/054* (2013.01); *H01M 2300/0068* (2013.01); *H01M 2300/0091* (2013.01)

(58) Field of Classification Search
CPC ........... C01B 31/02314; C01B 31/303; H01M 4/583; H01M 4/587; H01M 10/054; H01M 10/0562
USPC ............... 252/500, 502, 503, 506, 508, 509; 423/445 B, DIG. 39, DIG. 40
See application file for complete search history.

(56) References Cited

U.S. PATENT DOCUMENTS

| | | |
|---|---|---|
| 6,495,290 B1 | 12/2002 | Hinokuma et al. |
| 6,949,304 B2 | 9/2005 | Loutfy et al. |
| 7,384,574 B2 * | 6/2008 | Zidan .................. B82Y 30/00 252/182.32 |
| 7,537,748 B2 * | 5/2009 | Fujii .................... B82Y 30/00 423/413 |
| 7,887,957 B2 | 2/2011 | Shiga et al. |
| 8,088,534 B2 | 1/2012 | Kimoto |
| 2008/0145737 A1 * | 6/2008 | Cai .................. H01M 8/04089 429/410 |
| 2010/0323247 A1 | 12/2010 | Takeshi |

OTHER PUBLICATIONS

Teprovich et al., "Catalytic effect of fullerene and formation of nanocomposites with complex hydrides: NaAlH4 and LiAlH4", Journal of Alloys and Compounds, 509S, pp. S562-S566 (2011).*
English machine translation of Matsumoto et al., JP 2008-013375 A (2008).*
English machine translation of Imaeda et al., JP 09295803 A (1997).*
Loutfy et al., "Feasibility of fullerene hydride as a high capacity hydrogen storage material", the Proceedings of the 2001 DOE Hydrogen Program Review, vol. 134 (2001).*
Shane, et al.; NMR Study of LiBH4 with C60; J. Phys. Chem. C 2010, 114, 19862-19866; American Chemical Society; 2010.

* cited by examiner $\Delta E_{Li\ Interaction} = 7.0$ eV $\Delta E_{Li\ Interaction} = 5.86$ eV

SOLID STATE ELECTROLYTE COMPOSITES BASED ON COMPLEX HYDRIDES AND METAL DOPED FULLERENES/FULLERANES FOR BATTERIES AND ELECTROCHEMICAL APPLICATIONS

RELATED APPLICATIONS

This application claims the benefit of U.S. Provisional Application No. 61/830,770 filed on Jun. 4, 2014 and which is incorporated herein by reference.

STATEMENT AS TO RIGHTS TO INVENTIONS MADE UNDER FEDERALLY SPONSORED RESEARCH AND DEVELOPMENT

This invention was made with Government support under Contract No. DE-AC09-08SR22470 awarded by the United States Department of Energy. The Government has certain rights in the invention.

FIELD OF THE INVENTION

This invention is directed towards a solid state electrolyte based on complex hydrides and metal doped fullerenes and/or fulleranes. The Li ion conducting ability of the $LiBH_4$—$C_{60}$ nanocomposite as a function of temperature and $LiBH_4$ composition to quantify the Li ion conduction in the nanocomposite was analyzed and stored. It was determined that $C_{60}$ alters the interaction of the lithium action with the borohydride anion resulting in the observed increase in ionic conductivity.

BACKGROUND OF THE INVENTION

A variety of liquid electrolytes are known in the prior art. However, liquid electrolytes have inherent issues concerning safety, thermal runaway, low voltage, and poor cycle life.

Complex metal hydrides ($NaAlH_4$, $LiAlH_4$, $LiBH_4$, etc.) have been extensively evaluated for their hydrogen storage properties. However, these materials do not currently meet the US DOE requirements for solid-state on-board vehicular hydrogen storage. However, the physical and chemical properties of complex metal hydrides could be utilized as components in other energy storage and conversion devices. It is known in the art that $LiBH_4$ undergoes a structural phase change (occurring at ~390 K) from orthorhombic to hexagonal upon heating. The high temperature phase (hexagonal) has a conductivity of 10-3 Scm-1 while the low temperature phase (orthorhombic) has between 10-8 and 10-6 Scm-1. Additionally, the phase transition from orthorhombic to hexagonal results in a lowering of the activation energy required for conduction from 0.69 eV to 0.53 eV. It is further known that the introduction of inorganic salts, anions, and metal dopants can significantly enhance the mobility of the Li ion in the solid state. Stable cycling in an all solid-state lithium ion battery utilizing pure $LiBH_4$ as a solid-state electrolyte with $LiCoO_2$ and Li metal as the cathode and anode respectively as also known. The reported cell demonstrated a stable reversible capacity of ~86 mAh/g after 30 cycles when operated at 120° C. with a $Li_3PO_4$ thin film (~25 nm) on the $LiCoO_2$ cathode to prevent the highly reducing $LiBH_4$ from reacting with the metal oxide cathode at the electrolyte/cathode interface. On the anode side, recent work has demonstrated that the ionic conductor $LiBH_4$—LiI (3:1 mole ratio) can be used as coating to chemically passivate a $Li_{3.833}Sn_{0.8330.833}As_{0.166}S_4$ solid electrolyte and making it compatible with a metallic Li electrode and suggests a path forward to solve incompatibility issues observed for other ionic conductors with metallic Li electrodes. The hydrogen storage properties of a series of complex metal hydride-carbonaceous nanocomposites synthesized by a solvent-assisted mixing method have been evaluated. During these studies it was determined that $C_{60}$ was superior to other carbon nanomaterials in that it facilitated the reformation of the complex metal hydride as well as participated in the hydrogen storage process through the formation of C—H bonds, as set forth in Teprovich, J. A.; Knight, D. A.; Peters, B.; Zidan, R. J. Alloys Compd. 2013, 580, S364-S367 and Teprovich, J. A.; Knight, D. A.; Wellons, M. S.; Zidan, R. J. Alloys Compd. 2011, 509S, S562-S566, which are incorporated herein by reference. In the examination of the $LiBH_4$:$C_{60}$ system, solid state NMR techniques identified amorphous components of the materials as well as mobile species in the material. Utilizing Li NMR, the fraction of highly mobile lithium species in the nanocomposite was monitored. It was determined that the fraction of highly mobile Li+ in the $LiBH_4$—$C_{60}$ as-prepared (before heating and annealing) material was similar to that found in bulk $LiBH_4$. However, when the material was heated to 300° C. and annealed for 1 hour, the fraction of highly mobile species at room temperature was significantly enhanced. After this annealing step at 300° C., the Li spectrum at room temperature is narrower by a factor of 5 when compared to the bulk $LiBH_4$ and as-prepared $LiBH_4$—$C_{60}$ samples. This is similar to the effect observed when $LiBH_4$ is ball milled with lithium halides.

SUMMARY OF THE INVENTION

It is one aspect of one of the present embodiments to this application is for a solid state electrolyte composite that is made by solvent-assisted mixing of a metal hydride with a carbon nanomaterial. The material has high ionic conductivity ($Li^+$, $Na^+$, etc.) and low electrical conductivity as well as a large electrochemical operating window that will allow for the use of high capacity cathode materials. The system is unique in that it forms a metal intercalated polymerized $C_{60}$ material. It is the formation of the polymeric structure that facilitates the enhanced ionic mobility of the system. Due to the inherent electrical conductivity of $C_{60}$ it is believed useful to partially hydrogenate the carbon material in order to decrease the electrical conductivity because this will result in the "shorting" of the battery. The starting metal hydride material will determine which ion is mobile and can be used in a rechargeable battery. For example, starting with $LiBH_4$ the material could be used in a lithium ion battery. If the starting metal hydride is $NaBH_4$ the material could be used in a sodium ion battery. In order to improve the ionic conductivity of the composite material added catalysts or annealing the material may be used to achieve high ionic conductivity. In order to improve the safety of the material, it is believed useful to incorporate the solid composite electrolyte into an organic polymer (i.e. polyethylene oxide). It is also possible to develop a liquid electrolyte analogue of the material with the appropriate choice of solvent.

These and other features, aspects, and advantages of the present invention will become better understood with reference to the following description and appended claims.

DESCRIPTION OF THE PREFERRED EMBODIMENT

Figure 1:
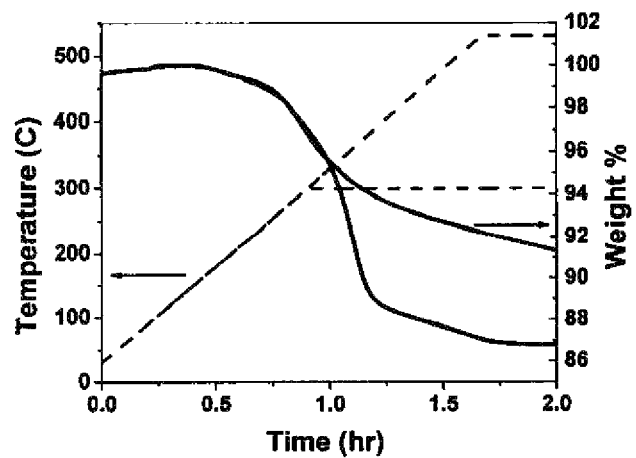
FIG. 1 is a TGA of the $LiBH_4$:$C_{60}$ (70:30) nanocomposite. Fully desorbed material (black) and partially desorbed sample (red). Solid line (TGA) and dash line (temperature). Heating rate is 5° C./min.

This application is for a solid state electrolyte composite that is made by solvent-assisted mixing of a metal hydride with a carbon nanomaterial. The material has high ionic conductivity ($Li^+$, $Na^+$, etc.) and low electrical conductivity as well as a large electrochemical operating window that will allow for the use of high capacity cathode materials. The system is unique in that it forms a metal intercalated polymerized $C_{60}$ material. It is the formation of the polymeric structure that facilitates the enhanced ionic mobility of the system. Due to the inherent electrical conductivity of $C_{60}$ is useful to partially hydrogenate the carbon material in order to decrease the electrical conductivity because this will result in the "shorting" of the battery. The starting metal hydride material will determine which ion is mobile and can be used in a rechargeable battery. For example, starting with $LiBH_4$ the material could be used in a lithium ion battery. If the starting metal hydride is $NaBH_4$ the material could be used in a sodium ion battery. In order to improve the ionic conductivity of the composite material catalysts may be added or the material annealed to achieve high ionic conductivity. In order to improve the safety of the material, one may incorporate the solid composite electrolyte into an organic polymer (i.e. polyethylene oxide). It is also be possible to develop a liquid electrolyte analogue of the material with the appropriate choice of solvent.

Reference will now be made in detail to the embodiments of the invention, one or more examples of which are set forth below. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features, and aspects of the present invention are disclosed in the following detailed description. It is to be understood by one of ordinary skill in the art that the present discussion is a description of exemplary embodiments only and is not intended as limiting the broader aspects of the present invention, which broader aspects are embodied in the exemplary constructions.

In describing the various figures herein, the same reference numbers are used throughout to describe the same material, apparatus, or process pathway. To avoid redundancy, detailed descriptions of much of the apparatus once described in relation to a figure is not, repeated in the descriptions of subsequent figures, although such apparatus or process is labeled with the same reference numbers.

This patent application is based on known Li salts electrolytes such as $LiPF_6$ and the other salts mentioned in the patents and carbon structures such as fullerenes.

This application describes a solid state electrolyte based on complex hydrides and metal doped fullerenes/fulleranes. The complex hydrides have two mobile ions. The metal doped fullerenes/fulleranes such as $Li_xC_{60y}/Li_xC_{6y}H_z$ are different material from the fullerenes. This invention describes the use of fullerenes/fulleranes that are doped with alkaline metals such as sodium, lithium or potassium, for example, in order to construct a polymer chains that enhance the mobility of ions such as hydrogen and metal ions such as $Na^+$, $Li^+$ and $K^+$ in complex hydrides such as $NaBH_4$, $LiBH_4$, $KBH_4$, or alanates based complexes such as $NaAlH_4$, $LiAlH_4$, $KAlH_4$. The polymerized alkaline doped fullerenes/fulleranes are prepared by annealing complex hydrides mixed with pure fullerenes. The mixture of the complex hydride and the polymerized alkaline doped fullerenes/fulleranes form a composite that functions as a solid electrolyte.

The complex hydrides can include fullerane hydrides including boronates, M ($BH_4$) such as $LiBH_4$, $NaBH_4$, $Mg(BH_4)_2$, $Al(BH_4)_3$ and similar fullerane hydrides. Aluminum based complex hydrides (alanates, $MAlH_4$) such as $LiAlH_4$, $NaAlH_4$, $Mg(AlH_4)_2$ and similar complex hydrides may also be used. In addition, Amides hydrides (M $NH_2$ or M NH) can be used such as $LiNH_2$, $NaNH_2$, $Mg(NH_2)_2$, $Ca(NH_2)_2$, CaNH, magnesium amides, and similar amides from the amide family may be used.

The complex hydrides and amide hydrides described above are useful for providing a solid electrolyte for use in battery systems and materials for hydrogen storage. In addition to $C_{60}$, other carbon nanostructures (i.e. carbon nanotubes) can be mixed with the metal hydrides capable of serving as a solid state electrolyte in battery systems. By proper selection of the complex hydride in combination with the $C_{60}$, one can create a battery system having a desired operating voltage window using a solid state electrolyte with the desired mobile metal ion.

All manipulations of the samples were performed in an argon-filled glove box or by utilizing Schlenk line techniques. Samples were prepared by dissolving $LiBH_4$ and $C_{60}$ (~1.0 g total) in 40 mL of THF with stirring for 5-12 hours.18 Solvent was then removed under vacuum and heated (80° C.) on a Schlenk line. The material was lightly ground with a mortar and pestle followed by additional vacuum and heated to remove residual THF. The resultant material is referred to as the "as-prepared" sample (AP). Annealing of the sample was also performed on a Schlenk line. The annealed sample (300 C) was heated to 300° C. at 5° C./min and soaked at that temperature for 1 hour under Ar flow.

A Perkin Elmer Thermogravimetric Analyzer-Pyris 1 TGA was used for TGA/RGA experiments. The sample was heated to the desired temperature using a heating rate of 5° C./min, with a sample size of ~5 mg. The gases released during the heating process were identified using a Hiden Analytical RGA. X-ray powder diffraction (XRD) was performed using a PANalytical X'pert Pro with Cu—Kα radiation, and the samples were protected with a Kapton® film to minimize oxidation of the sample.

Pellets of the materials were prepared by pressing the samples in a hydraulic press at 6 tons of pressure under inert conditions. Each pellet (65-85 mg) was 10 mm in diameter with a thickness between 0.8-1.0 mm. All electrochemical testing utilized a Swagelok-type cell. Electrochemical testing was performed using a Bio-Logic VMP3 multichannel potentiostat. Temperature dependent studies were performed in an oven with the appropriate electrical connections. For the conductivity and constant current cycling experiments, 10 mm diameter lithium foils were utilized in a symmetric cell set-up. For the all solid-state battery, and 1:1 composite of silicon (~325 mesh):carbon black was pressed onto a nickel foam current collector along with the solid state electrolyte at 6 tons in, order to reduce contact resistance between the two. A lithium foil was utilized as the other electrode. The cell was cycled between 0.01-1.0V vs. Li at a rate of 0.1 C.

$C_{60}$ introduction can enhance the conductivity of Li compared to pure $LiBH_4$. It was calculated, from first principles, the binding energy of the Li+ ion in isolated $LiBH_4$ and that interacting with $C_{60}$. The calculations are based on spin polarized density functional theory (DFT) as implemented in Vienna Ab Initio Simulation Package (VASP)23. In VASP simulations, the generalized gradient approximation (GGA) of exchange correlation functional in the form proposed by Perdew, Burke, and Ernzerhof (PBE)24 is used. The projector augmented wave (PAW) method25 with an energy cut-off of 400 eV is adopted. The simulation cell contains vacuum spaces of 12 Å along the x, y, and z directions, in order to avoid interaction between nearest neighbor images. The reciprocal space is represented by Γ point26 due to large simulation cell. All the structures are optimized using conjugate gradient method without any symmetric constraints. The convergence criteria of total energy and residue forces on each atom are set to be 1×10−4 eV and 0.02 eV/Å, respectively. For charged systems, we also include dipole interaction corrections.27

Fullerene ($C_{60}$; 98%, Sigma-Aldrich) was combined with $LiBH_4$ in anhydrous THF (99.9% purity). The $C_{60}$ concentration was 1.6 mol % relative to $LiBH_4$, approximately 0.54 g of $C_{60}$ for each gram of $LiBH_4$. After the solution was stirred for 1 h, the solvent was removed and the dark brown powder sample collected. The resulting material was examined when hydrogenated and found to consist of $LiBH_4$ and $Li_xC_{60y}/Li_xC_{6y}H_z$ fullerane polymers. The ratios of $C_{60}$ to $LiBH_4$ can be varied depending on the needed mobility.

Results and Discussion

TGA and XRD analysis was utilized to understand the changes that occur in the $LiBH_4$—$C_{60}$ system during annealing of the material at 300° C. The TGA showed that there was a 4.0 wt % loss of $H_2$ when the sample was heated to 300° C., followed by an additional loss of 4.7 wt % during annealing of the sample at 300° C. for 1 hour for a total mass loss of 8.7 wt %. As shown in FIG. 1, a loss of 13.2 wt % was observed upon full desorption of the $LiBH_4$—$C_{60}$ material at 530° C. This result indicates that the sample annealed at 300° C. remains partially hydrogenated with $C_{60}$—H bonds and $LiBH_4$. The presence of hydrogen in the nanocomposite after annealing is beneficial because in the fully dehydrogenated state the material has a high electrical conductivity that is not suitable for use as a solid-state electrolyte.

Figure 2:
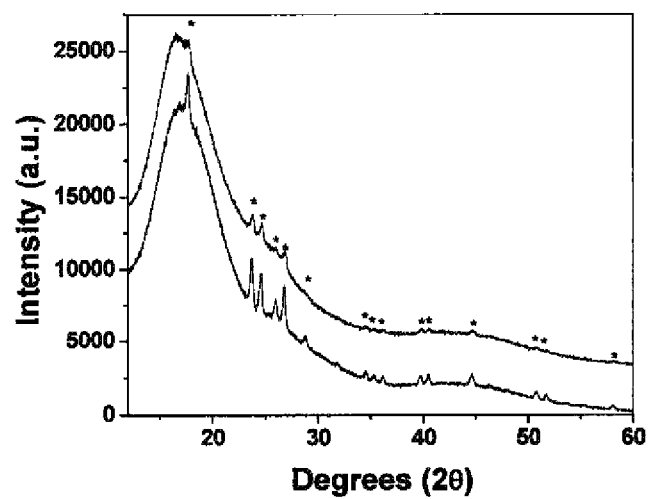
FIG. 2 sets forth the XRD of the $LiBH_4:C_{60}$ nanocomposite as-prepared and after annealing at 300° C. for 1 hour (black and red respectively). (*) denotes odhorhombic-$LiBH_4$.

The XRD of the $LiBH_4$—$C_{60}$ nanocomposite was taken in the as-prepared and the annealed (300° C.) state (FIG. 2). In the as-prepared state, $LiBH_4$ is present in the low temperature orthorhombic phase, and even after annealing the sample at 300° C., $LiBH_4$ remains detectable in the nanocomposite. However, the amount of $LiBH_4$ remaining in the sample is reduced as a result of its partial decomposition in the presence of $C_{60}$ during heating. The presence of crystalline $C_{60}$ was not observed in either sample. The absence of crystallinity could indicate the presence of defect sites and possibly free volume in this material which can play a role in the enhanced ion mobility as well Since the diffraction peaks for $C_{60}$ are not present in the XRD, it is presumed that the fullerenes are embedded within the material relatively homogeneously. Since it is known that $LiBH_4$ reduces the fullerenes in this material, $LiBH_4$ molecules around the fullerene are likely to contain defect sites from missing hydrogen. Therefore the contact area between a $LiBH_4$ crystal and $C_{60}$ would have defects sites and a larger void volume for Li ion conduction. The large amorphous feature at lower 2θ is due to the Kapton® film used to cover the sample and prevent oxidation of the sample during analysis.

The XRD study also shows that C60 does not stabilize the highly ionic conducting high temperature phase (hexagonal) of LiBH4 at room temperature. The stabilization of the high temperature phase at room temperature was previously achieved by adding lithium halides (LiI, LiBr, and LiCl) leading to the observed high lithium ionic conduction in those materials. This suggests that an enhancement of the lithium ionic conductivity in LiBH4, achieved by the addition of C60, is likely due to a different mechanism.

Figure 3:
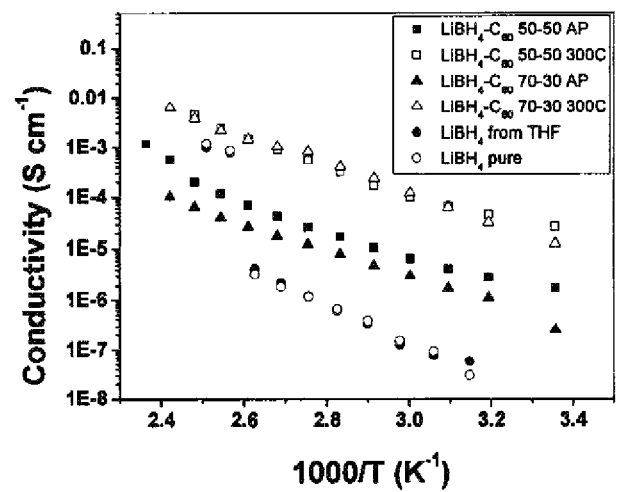
FIG. 3 is a conductivity measurement, of the $LiBH_4:C_{60}$ nanocomposites utilizing a symmetrical cell set up Li/SSE/Li (SSE=$LiBH_4$ based solid state electrolyte). The activation energy for each material was also calculated FIG. 4 sets forth the cycling stability of the $LiBH_4:C_{60}$ 300° C. nanocomposite in a symmetrical cell (Li/SSE/Li) with metallic lithium electrodes. The cell was cycled at a current density of 0.1 mA/cm-1 at 25° C. (black) and 80° C. (red).

The Li ion conductivity of the $LiBH_4$—$C_{60}$ nanocomposites was measured for the as-prepared and annealed states (FIG. 3) using a symmetric cell (Li/SSE/Li). Pure $LiBH_4$ and $LiBH_4$ that was subject to the same solvent assisted mixing procedure as the $C_{60}$ containing nanocomposites were also measured for comparison. The Li ionic conductivities of the pure $LiBH_4$ and solvent mixed $LiBH_4$, without $C_{60}$, were nearly identical and were also consistent with those previously reported. These results indicate that the enhancement of the Li ion mobility is not simply a result of the solvent-assisted mixing process and are in contrast to the observed enhancement of the Li ion mobility in pure $LiBH_4$ after ball-milling. In the as-prepared $LiBH_4$:$C_{60}$ (70:30 and 50:50 wt %) materials, an enhancement in the ionic conductivity is observed at lower temperatures relative to the pure $LiBH_4$ samples.

After annealing the as-prepared samples at 300° C. for 1 hour, a significant enhancement of the lithium ion mobility is observed, even at room temperature. Additionally, samples in which the weight percent of C60 exceeded that of LiBH4 were also prepared and analyzed. However, the $C_{60}$-rich samples were too electrically conductive to be utilized as a viable solid state electrolyte. The activation energy for conduction in each material was also determined from this data. The activation energy of the pure LiBH4 and LiBH4 subjected to solvent assisted mixing without C60 were 0.75±0.03 and 0.74±0.04, respectively, which is close to the low temperature phase (orthorhombic) value of 0.69 eV reported by Orimo. The as prepared and annealed at 300° C. samples prepared with a 70:30 wt. % (LiBH4:C60) had activation energies of 0.52±0.02 and 0.57±0.01 eV, respectively. The 50:50 wt % (LiBH4:C60) ratio as-prepared and annealed at 300° C. samples had activation, energies of 0.52±0.02 and 0.62±0.02 eV, respectively. This indicates that the activation energy for conduction in our $LiBH_4$—$C_{60}$ materials is comparable to what is observed for the highly conducting hexagonal phase of pure $LiBH_4$ which is present at temperatures greater than 390K.

Figure 4:
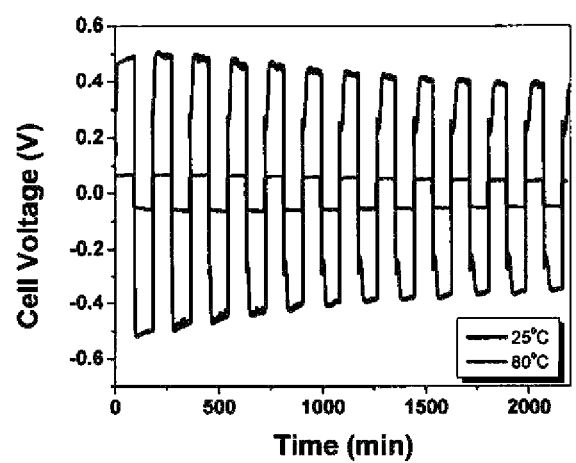

FIG. 4 shows cycling of the $LiBH_4$—$C_{60}$ nanocomposite in a symmetrical cell and demonstrates the stability of this material versus a pure Li electrode at 25 and 80° C. The compatibility and stability of our nanocomposite with a pure Li electrode is similar to that observed for $\beta$-$Li_3PS_4$ and indicates that it could be compatible for use in an all solid state battery utilizing Li metal as the anode.

Figure 5:
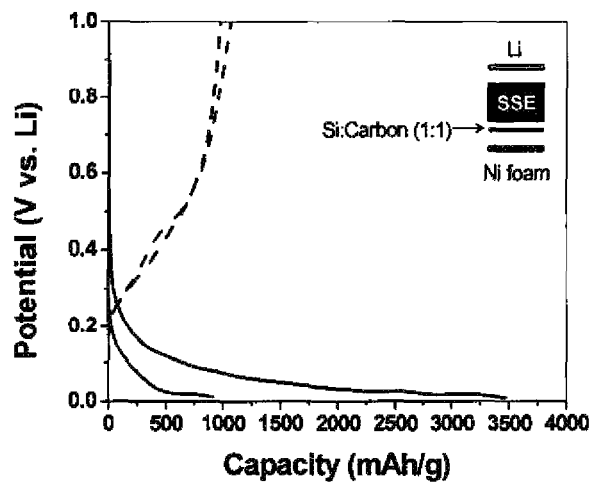
FIG. 5 is a galvanostatic cycling of an all-solid state cell utilizing silicon as the active anode material with the $LiBH_4$: $C_{60}$ annealed (300° C.) nanocomposite serving as the solid state electrolyte, and lithium metal serving as the cathode (Li/SSE/Si). Cell operated at 80° C. with at a current density of 500 mA/g. $1^{st}$ cycle (black) and $2^{nd}$ cycle (red). Inset shows the cell set-up of the all solid-state battery.

As part of this study, an all solid state cell utilizing silicon, as the anode, our $LiBH_4$:$C_{60}$ material as the solid electrolyte, and lithium foil as the cathode was investigated. FIG. 5 shows the first two galvanostatic charge/discharge cycles of an all solid-state cell utilizing our solid state electrolyte and silicon as the active anode material at an operating temperature of 80° C. A first discharge capacity of 3480 mAh/g was observed which corresponds to ~91% of the theoretical capacity for $Li_{4.4}Si$ (4200 mAh/g); however, only two full cycles were achieved as the cell performance continued to degrade.

This is attributed to the loss in electrical conductivity in the silicon based anode as a result of its large volume expansion (ca. 300%) upon lithiation. Additionally, we were able to incorporate the solid state electrolyte into a full cell (Li/SSE/$LiCoO_2$) and test the cell over multiple cycles. The cell was cycled 5 times at 50° C. and 80° C. and showed reversible capacities of 8.5 and 10.4 mAh/g, respectively (supporting information). This low capacity can be attributed to use of commercially available $LiCoO_2$ on Al foil utilized in the assembly of the cell. It is likely that only the top layers of the $LiCoO_2$ film in contact with the solid electrolyte participated in the electrochemical cycling while the bottom layers were electrochemically inactive. It is also possible that a chemical reaction between the solid electrolyte and the $Li_{1-x}CoO_2$ is occurring at the interface as $LiBH_4$ is still present in the solid-state electrolyte. This reaction will lead to the reduction of the transition metal oxide phases.

Recent work describing the reorientations and perturbations on the $BH_4^-$ may provide insight into the mechanism of the observed high ionic conduction. NMR, neutron vibrational spectroscopy, and quasi-elastic neutron scattering have demonstrated the possibility that the enhanced rotational motion of the $BH_4^-$ results in the enhancement of the Li ion mobility in this system via a "paddle-wheel" mechanism, analogous to that observed for $Li_2SO_4$. In this type of mechanism, the rotating anions promote and assist in the Li cation diffusion jumps resulting in high cationic conductivity. Recent studies have also demonstrated that an enhancement in the $Na^+$ diffusional jump rate and ion mobility is directly related to the rapid reorientation and rotation of $[B_{12}H_{12}]^{2-}$ in $Na_2B_{12}H_{12}$. The authors also suggest that the anion to cation size ratio can also play a role in enhancing the ionic mobility because larger anions (i.e. $[B_{12}H_{12}]^{-2}$) can possibly lead to enlarged interstitial diffusion pathways. It is possible that the larger $C_{60}$ molecule, which readily accepts electrons to form stable anions, in the $LiBH_4$—$C_{60}$ composite is behaving in this manner. The calculated diameters of $B_{12}H_{12}^{2-}$ and $C_{60}$ molecules using density functional theory are, respectively, 5.83 Å and 7.10 Å. As expected, the $C_{60}$ is larger than the $B_{12}H_{12}$ and may be one of the mechanisms involved in the enhancement of Li ion conductivity.

NMR studies indicates that $C_{60}$ interacts with the $BH_4^-$ ion, resulting in a perturbation of the $Li^+$—$BH_4^-$ bonding. This change in interaction allows for an increase in the $Li^+$ ion mobility, which explains the observed enhancement in ionic conductivity. Another possibility is that the $C_{60}$ is partially polymerized (through a reaction with $LiBH_4$) during the solvent assisted mixing/annealing process, resulting in the formation of vacancies and/or channels for translational $Li^+$ diffusion. This was previously observed for a $Li_4C_{60}$ polymer which also displayed high ionic conductivity with a low activation energy for Li ion diffusion owing to the two unoccupied Li+ interstitial sites in voids derived from the octahedral sites. However, it is likely that this material is too electrically conductive to be utilized as a solid electrolyte. Instead our material still contains C—H bonds which reduces the electrical conductivity of the material while maintain the high ionic conductivity desirable for solid state electrolytes. This approach of using hydrogen to reduce the electrical conductivity of carbon-based, solid ionic electrolytes may be applied to other $M_xC_y$ (i.e. $Li_4C_{60}$) materials.

Figure 6:
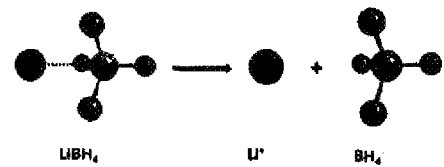
FIG. 6 sets forth Li interaction in $LiBH_4$ with and without presence of $C_{60}$.
Figure 6:
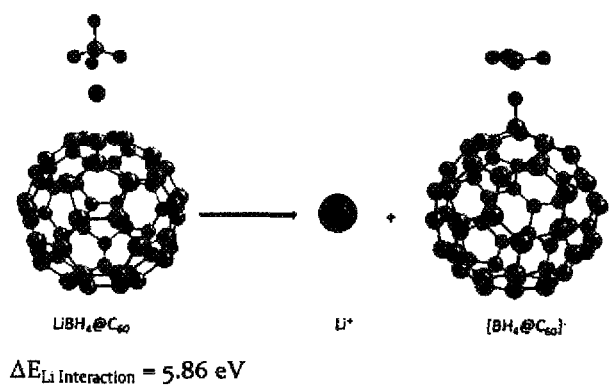
Figure 7:
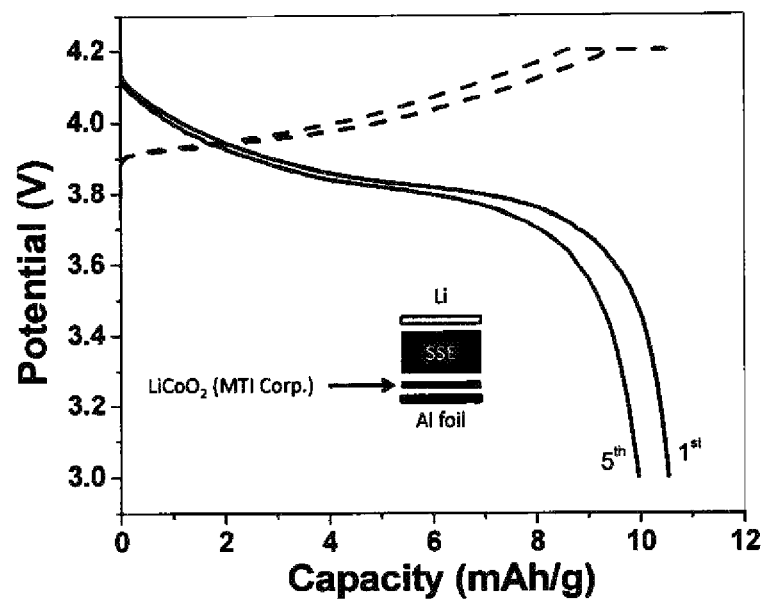
FIG. 7 sets forth cycling of an all solid-state cell utilizing a commercial $LiCoO_2$ film as the cathode, lithium foil as the anode, and the $LiBH_4$—$C_{60}$ as the solid state electrolyte. The $1^{st}$ cycle is shown in red and the $5^{th}$ cycle is shown in black. The solid line is the discharge and the dash line is the charging step. The cell was cycled at ±0.05 mA between 3.0-4.2V. After the constant current charging of the cell, a constant voltage charging step at 4.2V was performed with a cut-off current of 0.01 mA. Cycling was performed at 80° C. Inset shows the cell set-up.
Figure 8:
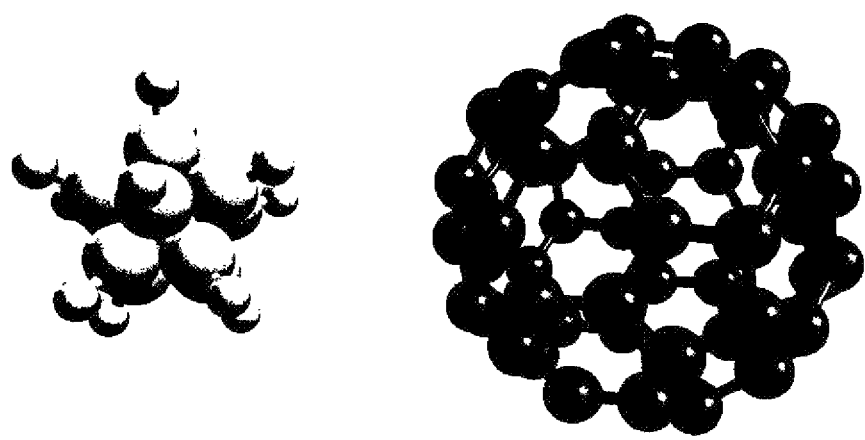
FIG. 8 sets forth the empirical optimization of the neutral species $B_{12}H_{12}$.

First principles calculations show that in the ground state structure of $LiBH_4$, $BH_4$ forms a tetrahedral pyramid with the Li atom residing under B (Li—B bond length of 1.96 Å). When the $Li^+$ is removed, the $BH_4^-$ forms a stable cluster with $T_d$ symmetry group. The binding energy between the $Li^+$ and the $BH_4^-$ cluster ($E_b$=$E_{Li}^+$+$E_{BH4}^-$−$E_{LiBH4}$) is calculated to be 7.00 eV (FIG. 6). However, when $C_{60}$ is introduced, the Li atom prefers to reside on the hollow site atop a pentagonal C ring, forming $LiBH_4$—$C_{60}$ compound. In this case, the binding energy between the $Li^+$ and the ($C_{60}$—$BH_4$)$^-$ cluster ($E_b$=$E_{Li}^+$+$E_{C60\text{-}BH4}^-$−$E_{C60\text{-}LiBH4}$) is decreased to 5.86 eV, indicating that it is much easier to remove $Li^+$ from the $LiBH_4$ attached to $C_{60}$. This is consistent with experimental finding of fast ionic conduction of $Li^+$ in $LiBH_4$—$C_{60}$. More interestingly, we observe that once $Li^+$ is removed, one of the hydrogen atoms from $BH_4^-$ is detached and binds to a C atom in $C_{60}$ cluster, carrying the negative charge with it and forming a hydrogenated $C_{60}$ cluster ($C_{60}$—H). This is also in agreement with experimental findings where hydrogenated fullerene was detected. Bader's charge analysis[35] reveals that the extra electron of the $C_{60}$—$BH_4^-$ resides on $C_{60}$—H (carrying 0.82 e), leaving the $BH_3$ molecule in almost neutral form (only has 0.18 e). The interaction between the $C_{60}$—$H^{-0.82}$ and the $BH_3^{-0.18}$ is weak and the $BH_3$ can be easily released.

As mentioned above the electrolyte described herein is a composite made of complex hydrides and metal doped fullerenes/fulleranes. It should be emphasized that these complex hydrides have two mobile ions, in the case of $LiBH_4$ the two ions are positive $Li^+$ ion and negative $BH_4^-$ ion. The electrolyte can be used not only to transport alkaline ions such as $Na^+$, $Li^+$ and $K^+$ in the solid electrolyte but also the hydrogen ions through ionic groups such as $BH_4^-$ or $AlH_4^-$. The Composite made of $LiBH_4$—$C_{60}$ was tested and found that the mobility of $Li^+$ and H ions (Hydrogen in the form of $BH_4^-$) were much higher than the mobility of $Li^+$ and H (Hydrogen) ions in just the pure complex hydride ($LiBH_4$). This tremendous enhancement allows the polymer composite made of $LiBH_4$—$C_{60}$ to be used as a solid state electrolyte at lower temperature than just the complex hydride alone.

We have measured the mobility of the ions mentioned above using NMR and here are the findings that support our claims for our composite to be a solid state electrolyte. For this reason our composite electrolyte can transport not only metal ions but also hydrogen ions (as $BH_4^-$ in this example), which differs from the other prior art.

$LiBH_4$—$C_{60}$ system is only one example based on one complex hydride but there are many others that could be used e.g. $NaAlH_4$, $LiAlH_4$, $NaBH_4$ depending on the electrodes. The THF is only an example of one solvent but that can vary and ether or toluene and other solvents can be used depending on the solubility of the precursor (fullerenes and hydrides).

In conclusion, we, have developed and demonstrated a new $LiBH_4$—$C_{60}$ solid-state electrolyte that is capable of being utilized in an all solid-state LiB cell. The activation energy for lithium ion conduction in our nanocomposite is lower than activation energy of lithium ion conduction in pure $LiBH_4$. First principles calculations show that it is easier to remove $Li^+$ from $LiBH_4$—$C_{60}$ than from pure $LiBH_4$. Removal of $Li^+$ allows $BH_4^-$ to interact with $C_{60}$, eventually hydrogenating it and releasing neutral $BH_3$. We have successfully demonstrated that this electrolyte is compatible with a pure lithium metal electrode during extended cycling. The use of $C_{60}$ to enhance the ionic conductivity is a significant departure from the commonly utilized inorganic additives currently used to enhance Li ion mobility in $LiBH_4$ based materials. This methodology could potentially be utilized to enhance alkali-ion mobility in other complex hydrides.

The composite material of LiBH4-C60 is compatible with lithium electrodes. There are a number of promising solid state, electrolytes that have been developed which are not compatible with a lithium metal electrode and will decompose. It is believed that the composite materials in the present invention can be used as an intermediate layer between a pure lithium anode and a solid-state electrolyte. Accordingly, it is possible to coat a solid-state electrolyte with the LiBH4-C60 composite material described herein and use it to protect the solid-state electrolyte when present in all solid-state battery having a pure lithium electrode.

Although preferred embodiments of the invention have been described using specific terms, devices, and methods, such description is for illustrative purposes only. The words used are words of description rather than of limitation. It is, to be understood that changes and variations may be made by those of ordinary skill in the art without departing from the spirit or the scope of the present invention. In addition, it should be understood that aspects of the various embodiments may be interchanged, both in whole, or in part. Therefore, the spirit and scope of the invention should not be limited to the description of the preferred versions contained therein.

What is claimed is:

1. A process for manufacturing a complex hydride-$C_{60}$ nanocomposite for use as an electrolyte in a battery comprising the steps of:
   dissolving a complex metal hydride and a $C_{60}$ in the presence of a solvent;
   removing the solvent, thereby providing a solid-state complex metal hydride-$C_{60}$ material;
   annealing the solid-state complex metal hydride $C_{60}$ material at about 300° C. and in the presence of an inert gas, thereby providing a solid-state complex metal hydride-metal doped $C_{60}$ nanocomposite;
   placing the solid-state complex metal hydride-metal doped $C_{60}$ nanocomposite in a battery as a solid-state electrolyte to enhance a mobility of metal ions and hydrogen containing ions from the complex metal hydride within the solid-state electrolyte with the metal doped $C_{60}$.

2. The process according to claim 1, wherein the complex metal hydride is a boron hydride selected from the group consisting of $LiBH_4$, $NaBH_4$, $Mg(BH_4)_2$, $Al(BH_4)_3$ and combinations thereof.

3. The process according to claim 1, wherein the complex metal hydride is an aluminum based complex hydride selected from the group consisting of $LiAlH_4$, $NaAlH_4$, $Mg(AlH_4)_2$ and combinations thereof.

4. The process according to claim 1, wherein the complex metal hydride is an amide hydride selected from the group consisting of $LiNH_2$, $NaNH_2$, $Mg(NH_2)_2$, $Ca(NH_2)_2$, CaNH, magnesium amides, and combination thereof.

5. The process according to claim 1, wherein the metal doped $C_{60}$ is hydrogenated.

* * * * *